US012637619B2

(12) United States Patent
Lee et al.

(10) Patent No.: US 12,637,619 B2
(45) Date of Patent: May 26, 2026

(54) LIQUID CRYSTAL POLYESTER RESIN COMPOSITION, MOLDED ARTICLE, AND ELECTRONIC COMPONENT COMPRISING THE SAME

(71) Applicant: SE YANG POLYMER CO., LTD., Incheon (KR)

(72) Inventors: Sang Don Lee, Gyeonggi-do (KR); Seung Been Song, Gyeonggi-do (KR); Su hak Bae, Seoul (KR); Sun Hwa Jang, Gyeonggi-do (KR); Youn Eung Lee, Daejeon (KR); Ye Jin Kwon, Gyeonggi-do (KR)

(73) Assignee: SE YANG POLYMER CO., LTD., Incheon (KR)

( * ) Notice: Subject to any disclaimer, the term of this patent is extended or adjusted under 35 U.S.C. 154(b) by 0 days.

(21) Appl. No.: 18/892,903

(22) Filed: Sep. 23, 2024

(65) Prior Publication Data

US 2025/0163326 A1 May 22, 2025

(30) Foreign Application Priority Data

Nov. 22, 2023    (KR) ........................ 10-2023-0163330

(51) Int. Cl.
| | |
|---|---|
| *C09K 19/38* | (2006.01) |
| *C09K 19/02* | (2006.01) |
| *C09K 19/52* | (2006.01) |
| *C09K 19/54* | (2006.01) |

(52) U.S. Cl.
CPC .......... *C09K 19/3838* (2013.01); *C09K 19/02* (2013.01); *C09K 19/542* (2013.01); *C09K 2019/521* (2013.01)

(58) Field of Classification Search
CPC ...................................................... C09K 19/38
See application file for complete search history.

(56) References Cited

FOREIGN PATENT DOCUMENTS

| | | | |
|---|---|---|---|
| JP | 10053654 A | * | 2/1998 |
| JP | H10-53654 A | | 2/1998 |
| JP | 2008-239950 A | | 10/2008 |
| JP | 2010-215905 A | | 9/2010 |
| JP | 2016-535298 A | | 11/2016 |
| JP | 2019-073591 A | | 5/2019 |
| JP | 2019-151787 A | | 9/2019 |
| JP | 2022-524720 A | | 5/2022 |
| JP | 2022-104786 A | | 7/2022 |
| KR | 10-2015-0078913 A | | 7/2015 |
| KR | 10-2022-0095374 A | | 7/2022 |
| WO | 2020/175389 A1 | | 12/2021 |
| WO | 2022/004553 A1 | | 1/2022 |

OTHER PUBLICATIONS

JPH1053654 A Machine Translation (Year: 2025).*
Japanese Patent Office, First Office Action issued on Sep. 25, 2025 in corresponding Japanese Patent Application No. 2024-164116, 5 pages.
Ministry of Intellectual Property, Office Action issued on Jan. 14, 2026 in corresponding Korean Patent Application No. 10-2023-0163330, 5 pages.

* cited by examiner

*Primary Examiner* — Chanceity N Robinson
(74) *Attorney, Agent, or Firm* — J. Peter Paredes; Amin Wasserman Gurnani LLP

(57) ABSTRACT

A liquid crystal polyester resin composition, a molded article, and an electronic component material including the same are disclosed. The liquid crystal polyester resin composition comprising a liquid crystal polyester resin, a polyphenyl sulfide resin, a carbon-based filler, and an inorganic filler has good mechanical properties, good weld line impact strength, high dimensional stability, and resistance to dust generation.

9 Claims, No Drawings

1

LIQUID CRYSTAL POLYESTER RESIN COMPOSITION, MOLDED ARTICLE, AND ELECTRONIC COMPONENT COMPRISING THE SAME

CROSS-REFERENCE TO RELATED APPLICATIONS

The present application claims priority to Korean application serial no. 10-2023-0163330, filed Nov. 22, 2023, herein incorporated by reference in its entirety.

TECHNICAL FIELD

Embodiments of the present invention relate to a liquid crystal polyester resin composition, a molded article, and an electronic component material including the same and, more particularly, to a liquid crystal polyester resin composition that has good mechanical properties, good weld line impact strength, high dimensional stability, and resistance to dust generation, a molded article, and an electronic component material including the same.

BACKGROUND

A liquid crystal polyester resin refers to a molten polyester resin in which molecular chains in a polymer are aligned in a highly ordered, parallel fashion. This ordered arrangement of molecules is commonly referred to as a liquid crystalline phase or a nematic phase of liquid crystals. These polymer molecules are generally long, thin, and flat, resulting in exceptional mechanical strength, electrical properties, and heat resistance along a long chain of the molecules.

Liquid crystal polyester resin-based compositions offer excellent heat resistance and high fluidity, making them ideal for a wide range of electrical/electronic applications. As small portable devices, such as laptops, become thinner, lighter, and more powerful, demand for liquid crystal polyester resin compositions having good moldability is on the rise.

However, liquid crystal polyester resin compositions are characterized in that a molten polymer does not lose a crystalline structure thereof during flow. Accordingly, when the resin composition is injection molded into an article with a complex shape, weld lines are formed at an interface where resin flows meet during the molding process. These weld lines are very weak, making the molded article susceptible to damage caused by internal/external impact or friction.

In addition, molded articles manufactured from liquid crystal polyester resin compositions are prone to fibrillization, a phenomenon in which the surface of the molded article is peeled off, forming fibrils, due to ultrasonic cleaning or friction with other members. When these molded articles are used as electronic components of an electronic product, foreign matter falling off of a fibrillized region, such as dust or fibrils, can significantly impair the performance of the electronic product.

For example, in the case of electronic components, especially optical devices with lenses, adhesion of particulate contaminants, such as dirt and dust, to the lenses can severely compromise optical properties of the optical devices. Fibrillization can occur during assembly or operation of a camera module. The same applies to a camera module for mobile phones. Specifically, when the camera's autofocus function is activated, dust particles can be generated from the surface of components of the camera module due to sliding movement of the components. Dust particles can also be generated when the device is impacted or dropped. With the recent trend toward miniaturization of peripheral devices and accessories used in electronic products, there has been a growing need for an electronic component material that is resistant to dust generation and thus is useful as a material for dust-sensitive semiconductor and optical components.

In this regard, Korean Patent Laid-open Publication No. 10-2014-0007792 discloses a liquid crystal polyester resin composition designed to obtain molded articles that are highly resistant to fibrillization.

SUMMARY

Embodiments of the present invention provide a liquid crystal polyester composition that is resistant to physical damage caused by internal/external friction and internal/external impact, has improved mechanical properties in terms of tensile strength, impact strength, and weld line impact strength, provides high dimensional stability due to low shrinkage thereof, and minimizes dust generation and fibril formation, and an electronic component material including the same.

In accordance with one aspect of the present invention, there is provided a liquid crystal polyester resin composition including: a liquid crystal polyester resin; a polyphenylene sulfide resin; carbon-based fillers; and inorganic fillers, wherein the inorganic fillers include glass powder.

Preferably, the liquid crystal polyester resin composition includes: 55 wt % to 85 wt % of the liquid crystal polyester resin; greater than or equal to 1 wt % and less than 15 wt % of the polyphenylene sulfide resin; 1 wt % to 5 wt % of the carbon-based fillers; and 5 wt % to 30 wt % of the inorganic fillers.

Preferably, the carbon-based fillers include at least one selected from the group consisting of carbon black, graphite, and carbon nanotubes.

Preferably, the inorganic fillers include at least one selected from the group consisting of serpentinite, montmorillonite, talc, mica, chlorite, glass flakes, silica, quartz powder, glass beads, glass powder, calcium silicate, aluminum silicate, kaolin, clay, siliceous earth, wollastonite, iron oxide, titanium oxide, zinc oxide, alumina, calcium carbonate, magnesium carbonate, calcium sulfate, barium sulfate, silicon carbide; silicon nitride, boron nitride, potassium titanate, and molybdenum disulfide ($MoS_2$).

Preferably, a molded article manufactured from the liquid crystal polyester resin composition has a weld line impact strength of greater than 20 J/m.

Preferably, a molded article manufactured from the liquid crystal polyester resin composition has a dent depth of less than 30 μm.

Preferably, a molded article manufactured from the liquid crystal polyester resin composition has a dent volume of 14,600,000 μm³ or less.

In accordance with another aspect of the present invention, there is provided a liquid crystal polyester resin composition including a liquid crystal polyester resin, a polyphenylene sulfide resin, and fillers, wherein, when a tape is detached from a specimen prepared from the liquid crystal polyester resin composition after being attached thereto, a peeled-off area of the specimen is less than 15% of the total area of a region of the specimen with the tape attached thereto.

In accordance with a further aspect of the present invention, there is provided a molded article manufactured from the liquid crystal polyester resin composition described above.

In accordance with yet another aspect of the present invention, there is provided an electronic component material including the liquid crystal polyester resin composition described above.

The liquid crystal polyester resin composition according to the present invention, the molded article, and the electronic component material including the same have good mechanical properties in terms of tensile strength, impact strength, and weld line impact strength.

In addition, the liquid crystal polyester resin composition according to the present invention has high dimensional stability due to low shrinkage thereof both in the MD (resin flow direction) and the TD (direction perpendicular to the resin flow direction).

Furthermore, the liquid crystal polyester resin composition according to the present invention, the molded article, and the electronic component material including the same are resistant to dust generation and fibril formation caused by internal/external friction and impact.

In addition, the liquid crystal polyester resin composition according to the present invention is resistant to peeling-off caused by internal/external factors including stickiness, friction, vibration, and the like, thereby significantly reducing damage to a molded article or an electronic component manufactured therefrom and generation of dust and fibrils.

Furthermore, due to resistance to dust generation/fibril formation and good weld line impact strength thereof, the liquid crystal polyester resin composition according to the present invention, the molded article, and the electronic component material including the same can be used as a material for components of electronic products sensitive to internal/external impact and internal/external friction. In particular, when used as a material for components of a camera module, especially components of a camera module of mobile phones, the liquid crystal polyester resin composition according to the present invention can contribute to maintaining or improving optical performance such as pixel count and image quality.

DETAILED DESCRIPTION OF EMBODIMENTS

Hereinafter, exemplary embodiments of the present invention will be described.

Unless stated otherwise, technical and scientific terms as used herein have a meaning generally understood by those skilled in the art. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

In addition, it will be understood that the terms "includes", "comprises", "including" and/or "comprising," when used in this specification, specify the presence of stated elements, but do not preclude the presence or addition of one or more other elements.

In accordance with one aspect of the present invention, a liquid crystal polyester resin composition may include a liquid crystal polyester resin, a polyphenylene sulfide resin, and fillers.

The liquid crystal polyester resin exhibits liquid crystallinity when melted and is preferably melted at a temperature of 450° C. or less.

The liquid crystal polyester resin may have a weight average molecular weight of about 10,000 g/mol to 300,000 g/mol, preferably about 10,000 g/mol to 50,000 g/mol, in view of mechanical strength and injection moldability thereof. If the weight average molecular weight of the liquid crystal polyester resin is less than 10,000 g/mol, the liquid crystal polyester resin composition can have poor mechanical strength, making a molded article manufactured therefrom prone to damage, whereas, if the weight average molecular weight of the liquid crystal polyester resin exceeds 300,000 g/mol, the liquid crystal polyester resin composition can have poor fluidity and thus poor injection moldability.

The liquid crystal polyester resin may be present in an amount of about 55 wt % to about 85 wt %, preferably about 60 wt % to about 80 wt %, more preferably about 65 wt % to about 80 wt %, based on the total weight of the liquid crystal polyester resin composition. If the content of the liquid crystal polyester resin is less than about 55 wt %, the resin composition can have poor fluidity, making micro-injection molding thereof difficult. If the content of the liquid crystal polyester resin component exceeds about 85 wt %, the resin composition can have excessively high fluidity, resulting in deterioration in strength and heat resistance of a molded article or an electronic component manufactured therefrom.

The liquid crystal polyester resin may include at least one selected from the group consisting of a liquid crystal polyester amide, a liquid crystal polyester ether, a liquid crystal polyester carbonate, and a liquid crystal polyester imide.

Preferably, the liquid crystal polyester resin includes a wholly aromatic liquid crystal polyester prepared using only an aromatic compound as a monomer material. Typical examples of the wholly aromatic liquid crystal polyester include: resins prepared by polymerization (polycondensation) of one or more compounds selected from the group consisting of aromatic hydroxycarboxylic acids, aromatic dicarboxylic acids, aromatic diols, aromatic hydroxyamines, and aromatic diamines; resins prepared by polymerization of two or more aromatic hydroxycarboxylic acids; resins prepared by polymerization of one or more compounds selected from the group consisting of aromatic dicarboxylic acids, aromatic diols, aromatic hydroxyamines, and aromatic diamines; and resins prepared by polymerization of a polyester such as polyethylene terephthalate with an aromatic hydroxycarboxylic acid.

The liquid crystal polyester resin may be prepared by forming a liquid crystal polyester prepolymer by polycondensation of one or more aromatic monomers, followed by solid-phase polycondensation of the prepolymer. Removal of by-products of the solid-phase polycondensation process may be achieved by purging with an inert gas or evacuation.

The liquid crystal polyester resin used in the resin composition according to the present invention may be prepared by polymerization of one or more monomers selected from the group consisting of, for example, hydroxybenzoic acid (HBA), hydroxynaphthoic acid (HNA), biphenol (BP), terephthalic acid (TPA), and hydroxyacetanilide (APAP).

For example, the liquid crystal polyester resin may be prepared by polymerization of a monomer mixture including 56 mol % to 66 mol % of hydroxybenzoic acid (HBA), 2 mol % to 8 mol % hydroxynaphthoic acid (HNA), 9 mol % to 17 mol % of biphenol (BP), 11 mol % to 21 mol % of terephthalic acid (TPA), and 2 mol % to 8 mol % of hydroxyacetanilide (APAP). Within these content ranges of the aforementioned monomers, the liquid crystal polyester resin can secure fluidity and the resin composition including the same can improve mechanical properties of a final product, such as impact strength, while minimizing generation of dust and fibrils.

The polyphenylene sulfide resin used in the resin composition according to the present invention (hereinafter, "PPS resin") may serve as an impact modifier.

The polyphenylene sulfide resin may include at least one of a linear polyphenylene sulfide resin or a cross-linked polyphenylene sulfide resin. Specifically, the polyphenylene sulfide resin may include a polyphenylene sulfide resin having a melt index (MI) of 10 g/10 min to 300 g/10 min at a temperature of 316° C. under a load of 2.16 kg, in view of thermal stability and workability.

The polyphenylene sulfide resin may be present in an amount of greater than or equal to 1 wt % and less than 15 wt % based on the total weight of the liquid crystal polyester resin composition. If the content of the polyphenylene sulfide resin is less than 1 wt %, fibrils can be formed on the surface of a molded article or an electronic component manufactured from the resin composition, causing product failure. In addition, if the content of the polyphenylene sulfide resin exceeds 15 wt %, the liquid crystal polyester resin composition can have poor mechanical properties and poor dent resistance.

The fillers may include both carbon-based fillers and inorganic fillers.

The carbon-based fillers may include at least one selected from the group consisting of carbon black, graphite, and carbon nanotubes. These may be used alone or in combination thereof. Preferably, the carbon-based fillers include carbon black. The carbon-based fillers may be present in an amount of about 1 wt % to about 5 wt % based on the total weight of the liquid crystal polyester resin composition. For example, carbon black may be used as the carbon-based fillers to secure light-blocking properties. The carbon black may be present in an amount of about 1 wt % to about 5 wt % based on the total weight of the liquid crystal polyester resin composition. If the content of the carbon black is less than about 1 wt %, blackness of the liquid crystal polyester resin composition can be reduced, making it difficult to secure sufficient light-blocking properties. If the content of the carbon black exceeds about 5 wt %, carbon black particles can agglomerate together rather than being uniformly dispersed in the liquid crystal polyester resin composition, causing deterioration in physical properties of the resin composition and increasing the likelihood of agglomerates falling off as dust.

The inorganic fillers may serve to improve mechanical strength, heat resistance, and resistance to impact-induced dent of the resin composition. Mixing of the inorganic fillers with the liquid crystal polyester resin is required to be carried out without compromising mechanical properties (strength, stiffness, hardness, etc.), heat resistance, and electrical properties of the polyester resin. The inorganic fillers may include any non-fibrous fillers, such as flake-shaped fillers, particulate fillers, and the like.

The flake-shaped fillers may include serpentinite, montmorillonite, talc, mica (black mica, white mica, gold mica, etc.), chlorite, glass flakes, and the like.

The particulate fillers may include: silicates, such as silica, quartz powder, glass beads, glass powder, calcium silicate, aluminum silicate, kaolin, clay, siliceous earth, and wollastonite; metal oxides, such as iron oxide, titanium oxide, zinc oxide, and alumina; metal carbonates, such as calcium carbonate and magnesium carbonate; metal sulfates, such as calcium sulfate and barium sulfate; molybdenum disulfide; silicon carbide; silicon nitride; boron nitride; potassium titanate; and the like.

The inorganic fillers may include at least one selected from among the flake-shaped fillers described above, at least one selected from among the particulate fillers described above, or a combination thereof. For example, the inorganic fillers may include a combination of mica as the flake-shaped fillers and glass powder as the particulate fillers.

As the flake-shaped fillers, mica may serve to improve heat resistance and mechanical properties of the resin composition and to impart dimensional stability to a molded article manufactured from the resin composition.

Typically, glass powder has been difficult to use in liquid crystal polyester resin compositions due to amorphousness thereof. Advantageously, the liquid crystal polyester resin composition according to the present invention includes glass powder. With the use of glass powder, the liquid crystal polyester resin composition can provide improved weld line impact strength, obtain positive results in a tape test, suppress dust generation and fibril formation, and provide improved dimensional stability due to low shrinkage thereof both in the MD and the TD.

The glass powder may have an average particle diameter $(D_{50})$ of 2 μm to 40 μm.

The inorganic fillers may be present in an amount of 5 wt % to 35 wt %, preferably greater than or equal to 5 wt % and less than 30 wt %, more preferably 5 wt % to 25 wt %, based on the total weight of the liquid crystal polyester resin composition.

Preferably, the inorganic fillers include two or more types of inorganic fillers, including the glass powder. Here, the glass powder may be present in an amount of greater than or equal to about 1 wt % and less than about 18 wt %, preferably about 1 wt % to about 15 wt %, based on the total weight of the liquid crystal polyester resin composition. Inorganic fillers other than the glass powder may be present in an amount of about 4 wt % to about 17 wt %, preferably about 4 wt % to about 15 wt %, based on the total weight of the liquid crystal polyester resin composition.

In accordance with another aspect of the present invention, a molded article or an electronic component material may be manufactured from the liquid crystal polyester resin composition including the aforementioned components. The molded article or the electronic component material according to the present invention has good properties in terms of tensile strength, impact strength, and weld line impact strength, can obtain positive results in a tape test (when a tape is detached from a specimen prepared from the resin composition after being attached thereto, a peeled-off area of the specimen is less than 15% of the total area of a region of the specimen with the tape attached thereto), is highly resistant to dust generation and fibril formation, and has good dimensional stability due to low shrinkage thereof both in the MD and the TD. Particularly, when used as a material for components of a camera module of mobile devices, such as smartphones, the liquid crystal polyester resin composition according to the present invention can contribute to maintaining or improving optical performance of the camera module, such as pixel count, image quality, and the like.

Next, the present invention will be described in more detail with reference to some examples. However, it should be noted that these examples are provided for illustration only and are not to be construed in any way as limiting the present invention.

Preparative Example: Preparation of Liquid Crystal Polyester Resin

1. After 13,000 g (127.3 mol) of acetic anhydride was placed in a 200 L batch reactor, 20,000 g (144.8 mol)

of parahydroxybenzoic acid (HBA), 2,200 g (11.8 mol) of hydroxynaphthoic acid (HNA), 5,400 g (29.3 mol) of biphenol, 6,500 g (39.6 mol) of terephthalic acid (TPA), and 1,570 g (10.4 mol) of hydroxyacetanilide (APAP) as monomers were added to the reactor while rotating a stirrer, followed by further adding 12,300 g (120.5 mol) of acetic anhydride, and then the aforementioned components were mixed in the batch reactor.

2. 2.7 g of potassium acetate and 10.8 g of magnesium acetate as catalysts were added to the reactor, followed by injecting nitrogen to create an inert atmosphere inside the reactor.

3. After the reactor was heated over a period of 1 hour to a temperature allowing reflux of the acetic anhydride inside the batch reactor, hydroxyl groups of the monomers were acetylated at this temperature for 2 hours, followed by removal of excess unreacted acetic anhydride and acetic acid resulting from acetylation of the hydroxyl groups. Thereafter, the reactor was heated to 320° C. at a heating rate of 0.5° C./min, thereby preparing a liquid crystal polyester prepolymer, which, in turn, was cooled and solidified while being discharged through a lower valve of the reactor and then was primarily pulverized, thereby obtaining 32,000 g of a liquid crystal polyester prepolymer.

4. The liquid crystal polyester prepolymer was secondarily pulverized using a fine grinder and then introduced into a rotary heating device. Thereafter, polycondensation of the liquid crystal polyester prepolymer was carried out by heating the prepolymer to 200° C. for 2 hours while injecting nitrogen into the rotary heating device at a flow rate of 25 L/min, maintaining the temperature of the prepolymer at 200° C. for 2 hours, heating the prepolymer to 285° C. at a heating rate of 0.2° C./min, and maintaining the temperature of the heating device at 285° C. for 3 hours.

5. After completion of polycondensation of the prepolymer, a liquid crystal polyester resin was finally obtained. The obtained liquid crystal polyester resin had a melting point of 330° C.

Example 1: Preparation of Liquid Crystal Polyester Resin Composition 1. 76.7 wt % of the liquid crystal polyester resin prepared in Preparative Example (hereinafter "LCP resin") was mixed with 3 wt % of carbon black, 8 wt % of mica, 10 wt % of glass powder, and 4 wt % of a PPS resin. Details of the aforementioned components are shown in Table 1.

2. The resulting mixture was subjected to melt kneading in a twin-screw extruder (L/D: 44, diameter: 30 mm) at a barrel temperature of 340° C., followed by removal of by-products by evacuation, and then the melt-kneaded mixture was pelletized, thereby preparing a liquid crystal polyester resin composition in pellet form.

3. The prepared pellets were mixed in a mixer (JITD-50KW, JEIL Machinery Co., Ltd.) for 30 minutes and then dried in a hot air dryer (JIB-100KW, JEIL Machinery Co., Ltd.) at 150° C. for 2 hours.

TABLE 1

| Component | Manufacturer and characteristics |
| --- | --- |
| LCP resin | SEYANG LCP ® G600BB Powder, SEYANG POLYMER Co., Ltd. |
| Carbon black | HiBlack 30L, Orion Engineered Carbons Co., Ltd. |
| Mica | SM-325W (average particle diameter: 25 μm to 35 μm), SEOKYUNG CMT Co., Ltd. |
| Glass powder | ECOSNOW ® GLASS POWDER (average particle diameter ($D_{50}$): 14.5 μm), KCC Co., Ltd. |
| PPS resin | GAC03, GLION Co., Ltd. |

Examples 2 to 5: Preparation of Liquid Crystal Polyester Resin Composition

Liquid crystal polyester resin compositions were prepared in the same manner as in Example 1 except that the content of each component was changed as listed in Table 2.

Comparative Examples 1 to 4: Preparation of Liquid Crystal Polyester Resin Composition Liquid crystal polyester resin compositions were prepared in the same manner as in Example 1 except that the content of each component was changed as listed in Table 3.

TABLE 2

| | Example 1 | Example 2 | Example 3 | Example 4 | Example 5 | Comparative Example 1 | Comparative Example 2 | Comparative Example 3 | Comparative Example 4 |
| --- | --- | --- | --- | --- | --- | --- | --- | --- | --- |
| LCP resin | 75 | 71 | 67 | 71 | 71 | 79 | 64 | 71 | 71 |
| Carbon black | 3 | 3 | 3 | 3 | 3 | 3 | 3 | 3 | 3 |
| Mica | 8 | 8 | 8 | 13 | 5 | 8 | 8 | 18 | 0 |
| Glass powder | 10 | 10 | 10 | 5 | 13 | 10 | 10 | 0 | 18 |
| PPS resin | 4 | 8 | 12 | 8 | 8 | 0 | 15 | 8 | 8 |

Experimental Example 1: Tensile Strength of Liquid Crystal Polyester Resin Composition From each of the resin compositions of Examples 1 to 5 and Comparative Examples 1 to 4, a specimen having a size of 19 mm×130 mm×3.2 mm (width×length×thickness) was prepared.

Tensile strength of the prepared specimen was evaluated in accordance with ASTM D638. Results are shown in Table 3.

Experimental Example 2: Impact Strength of Liquid Crystal Polyester Resin Composition From each of the resin compositions of Examples 1 to 5 and Comparative Examples 1 to 4, a specimen having a size of 12.7 mm×64 mm×3.2 mm (width×length×thickness) was prepared.

Unnotched impact strength of the prepared specimen was evaluated in accordance with ASTM D256. Results are shown in Table 3.

Experimental Example 3: Shrinkage Rate of Liquid Crystal Polyester Resin Composition From each of the resin compositions of Examples 1 to 5 and Comparative Examples 1 to 4, a specimen having a size of 12.4 mm×80 mm×3 mm (width×length×thickness) was prepared by injection molding and then left in a constant temperature/constant humidity chamber at 23° C. and 50% RH for 1 day.

Shrinkage rate of the specimen was measured both in the MD and the TD. Results are shown in Table 3.

Experimental Example 4: Weld Line Impact Strength of Liquid Crystal Polyester Resin Composition From each of the resin compositions of Examples 1 to 5 and Comparative Examples 1 to 4, a specimen having a size of 12.4 mm×80 mm×3 mm (width×length×thickness) was prepared. In preparation of the specimen, a gate allowing injection of the resin composition into a mold cavity was positioned on both sides of the mold cavity, allowing weld lines to be formed at a center of the specimen where the resin flows from the two gates meet.

Weld line impact strength was measured by applying impact to a weld line region of the prepared specimen in an unnotched state using an Izod impact tester in accordance with ASTM D256. Results are shown in Table 3.

Experimental Example 5: Resistance to Fibril Formation of Liquid Crystal Polyester Resin Composition 1. From each of the resin compositions of Examples 1 to 6 and Comparative Examples 1 to 4, a specimen having a size of 12.4 mm×80 mm×3 mm (width×length×thickness) was prepared by injection molding and then subjected to conditioning in a constant temperature/constant humidity chamber at 23° C. and 50% RH for at least 8 hours.
2. The specimen was cleaned in an alkali aqueous solution (1%) for 8 minutes and in ultrapure water for 2 minutes at room temperature using a 40 kHz ultrasonic cleaner, followed by drying in a dryer at 80° C. for 30 minutes.
3. The specimen was subjected to air-blowing at room temperature for 10 seconds, followed by observing the presence of fibrils under an optical microscope (XY-GB2, HIROX Co., Ltd.).

4. For each of the resin compositions of Examples 1 to 5 and Comparative Examples 1 to 4, 100 specimens were tested.
5. After completion of Processes 1 to 4, the number of specimens exhibiting fibril formation was counted. Results are shown in Table 3.

Experimental Example 6: Tape Test of Liquid Crystal Polyester Resin Composition 1. From each of the resin compositions of Examples 1 to 5 and Comparative Examples 1 to 4, a specimen having a size of 12.7 mm×130 mm×3.2 mm (width×length×thickness) was prepared by injection molding
2. The surface of the specimen was washed with ethanol, followed by natural drying for about 10 minutes.
3. A tape having an area of 12.7 cm² (12.7 mm×100 mm (width×length)) (Scotch Magic Tape 810, 3M company) was attached to the specimen.
4. A region of the specimen with the tape attached thereto was compressed five times using a 3.7 kg weight and then was allowed to remain compressed for about 10 minutes.
5. A 2.6 kg weight was attached to the tape on the specimen and then was allowed to free fall to remove the tape from the specimen.
6. The area of the black resin composition on the removed tape was measured by microscopic observation. Results are shown in Table 3.

Experimental Example 7: Dent Resistance of Liquid Crystal Polyester Resin Composition 1. From each of the resin compositions of Examples 1 to 6 and Comparative Examples 1 to 4, a specimen having a size of 12.4 mm×80 mm×3 mm (width×length×thickness) was prepared by injection molding.
2. The prepared specimen was mounted on a dust simulator, followed by continuously dropping a 15 g ball from a height of 10 cm onto the specimen 70 times.
3. After the continuous drop test, the dent depth (μm) and dent volume (μm³) of the specimen were measured with an optical microscope (XY-GB2, HIROX Co., Ltd.) using a 3D tiling technique.
4. Processes 1 to 3 constituted a single test, which was conducted six times for each specimen, followed by calculating the average dent depth (μm) and average dent volume (μm³). Results are shown in Table 3.

TABLE 3

| | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| Tensile strength (MPa) | 130 | 118 | 125 | 125 | 111 | 139 | 99 | 130 | 105 |
| Impact strength (Unnotched) (kg · cm/cm) | 94 | 86 | 90 | 85 | 88 | 111 | 60 | 82 | 92 |
| Shrinkage rate in MD (%) | 0.03 | 0.06 | 0.04 | 0.05 | 0.01 | 0 | 0.08 | 0.03 | 0 |
| Shrinkage rate in TD (%) | 1.04 | 0.94 | 1 | 0.76 | 1.12 | 1.13 | 0.75 | 0.63 | 1.24 |

TABLE 3-continued

| | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| Weld line impact strength (J/m) | 23.9 | 24.7 | 25.1 | 20.3 | 27.3 | 13.4 | 26.3 | 14.1 | 32.3 |
| Number of specimens exhibiting fibril formation | 31 | 23 | 15 | 21 | 25 | 75 | 11 | 23 | 21 |
| Tape test (cm$^2$) | 1.16 | 1.01 | 0.79 | 1.69 | 0.90 | 1.32 | 1.27 | 10.48 | 0.53 |
| Dent depth (μm) | 23.3 | 25.5 | 27.3 | 25.9 | 24.8 | 20.3 | 30.3 | 26.1 | 24.7 |
| Dent volume (μm$^3$) | 1.33.E+07 | 1.44.E+07 | 1.39.E+07 | 1.42.E+07 | 1.46.E+07 | 1.22.E+07 | 1.66.E+07 | 1.59.E+07 | 1.49.E+07 |

The liquid crystal polyester resin compositions of Examples 1 to 5 had tensile strengths of 100 MPa or more and impact strengths of 80 KJ/m$^2$ or more, demonstrating good mechanical properties. In addition, these results indicate that the liquid crystal polyester resin compositions of Examples 1 to 5 had resistance to internal/external impact, resistance to dust generation, and stability against internal/external impact or friction. Conversely, the liquid crystal polyester resin composition of Comparative Example 2 exhibited poor properties in terms of both tensile strength and impact strength, which can be attributed to poor compatibility between the LCP resin and the PPS resin due to the excessive presence of the PPS resin.

The liquid crystal polyester resin compositions of Examples 1 to 5 exhibited shrinkage rates of less than 0.08% in the MD and shrinkage rates of less than 1.13% in the TD. In contrast, the liquid crystal polyester resin composition of Comparative Example 2 exhibited a shrinkage rate of about 0.08% in the MD and the liquid crystal polyester resin compositions of Comparative Examples 1 and 4 exhibited a shrinkages rate of about 1.13% or more in the TD. The high shrinkage rate of the resin compositions of Comparative Examples 1 and 2 can be attributed to the absence or excessive presence of the PPS resin, and the high shrinkage rate of the resin composition of Comparative Example 4 can be attributed to the excessive presence of the glass powder and the absence of other inorganic fillers.

The liquid crystal polyester resin compositions of Examples 1 to 5 exhibited good weld line impact strengths exceeding 20 J/m, demonstrating resistance to internal/external impact, resistance to dust generation, and stability against internal/external impact or friction. Conversely, the liquid crystal polyester resin compositions of Comparative Examples 1 and 3 exhibited poor weld line impact strengths of 20 J/m or less, indicating a higher susceptibility of a molded article manufactured therefrom to damage caused by internal/external impact. Poor weld line impact strength of the resin composition of Comparative Example 1 can be attributed to the absence of the PPS resin, and poor weld line impact strength of the resin composition of Comparative Example 3 can be attributed to the absence of the glass powder.

In the tape test, the liquid crystal polyester resin composition of Example 4 exhibited a peeled-off area of 1.69 cm$^2$, which is the largest among those of Examples, accounting for about less than 15% of the total area (12.7 cm$^2$) of a region of a specimen with a tape attached thereto. In addition, in the tape test, the liquid crystal polyester resin compositions of Examples 1 to 3 and 5 exhibited peeled-off areas of 0.79 cm$^2$ to 1.16 cm$^2$, accounting for 5% to 10% of the total area of a region of a specimen with a tape attached thereto. In contrast, the liquid crystal polyester resin composition of Comparative Example 3 exhibited a peeled-off area of about 10.48 cm$^2$, accounting for about 83% of the total area of a region of a specimen with a tape attached thereto. Poor peel resistance of the resin composition of Comparative Example 3 can be attributed to the absence of the glass powder.

The liquid crystal polyester resin compositions of Examples 1 to 5 exhibited high resistance to fibril formation, with 31 or fewer out of 100 specimens exhibiting fibril formation. Conversely, the liquid crystal polyester resin composition of Comparative Example 1 exhibited poor resistance to fibril formation, with 75 out of 100 specimens exhibiting fibril formation. Poor resistance to fibril formation of the resin composition of Comparative Example 1 can be attributed to the fact that the resin composition consisted solely of the LCP resin without the PPS resin.

The liquid crystal polyester resin compositions of Examples 1 to 5 exhibited dent depths of less than about 30 μm and dent volumes of about 14,600,000 μm$^3$ or less. In contrast, the liquid crystal polyester resin composition of Comparative Example 2 exhibited a dent depth of greater than 30 μm and the liquid crystal polyester resin compositions of Comparative Examples 2 to 4 exhibited dent volumes of greater than 14,600,000 μm$^3$. Poor dent resistance of the resin composition of Comparative Example 2 can be attributed to the excessive presence of the PPS resin, poor dent resistance of the resin composition of Comparative Example 3 can be attributed to the absence of the glass powder, and poor dent resistance of Comparative Example 4 can be attributed to the excessive presence of the glass powder and the absence of other inorganic fillers.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention.

The invention claimed is:

1. A liquid crystal polyester resin composition comprising:
  55 wt % to 85 wt % of a liquid crystal polyester resin;
  greater than or equal to 1 wt % and less than 15 wt % of a polyphenylene sulfide resin;
  1 wt % to 5 wt % of carbon-based fillers; and
  5 wt % to 30 wt % of inorganic fillers,
  wherein the inorganic fillers comprise glass powder.

2. The liquid crystal polyester resin composition according to claim 1, wherein the carbon-based fillers comprise at least one selected from the group consisting of carbon black, graphite, and carbon nanotubes.

3. The liquid crystal polyester resin composition according to claim 1, wherein the inorganic fillers further comprise at least one selected from the group consisting of serpentinite, montmorillonite, talc, mica, chlorite, glass flakes, silica, quartz powder, glass beads, calcium silicate, aluminum silicate, kaolin, clay, siliceous earth, wollastonite, iron oxide, titanium oxide, zinc oxide, alumina, calcium carbonate, magnesium carbonate, calcium sulfate, barium sulfate, silicon carbide; silicon nitride, boron nitride, potassium titanate, and molybdenum disulfide ($MoS_2$).

4. The liquid crystal polyester resin composition according to claim 1, wherein a molded article manufactured from the liquid crystal polyester resin composition has a weld line impact strength of greater than 20 J/m.

5. The liquid crystal polyester resin composition according to claim 1, wherein a molded article manufactured from the liquid crystal polyester resin composition has a dent depth of less than 30 μm.

6. The liquid crystal polyester resin composition according to claim 1, wherein a molded article manufactured from the liquid crystal polyester resin composition has a dent volume of 14,600,000 $μm^3$ or less.

7. A liquid crystal polyester resin composition comprising:

55 wt % to 85 wt % of a liquid crystal polyester resin;

greater than or equal to 1 wt % and less than 15 wt % of a polyphenylene sulfide resin;

1 wt % to 5 wt % of carbon-based fillers; and 5 wt % to 30 wt % of inorganic fillers, wherein, when a tape is detached from to a specimen prepared from the liquid crystal polyester resin composition after being attached thereto, a peeled-off area of the specimen is less than 15% of the total area of a region of the specimen with the tape attached thereto.

8. A molded article manufactured from the liquid crystal polyester resin composition according to claim 1.

9. An electronic component material comprising the liquid crystal polyester resin composition according to claim 1.

* * * * *